(12) United States Patent
Vogel

(10) Patent No.: US 6,840,866 B2
(45) Date of Patent: Jan. 11, 2005

(54) METHOD FOR PRODUCING A NUT, SCREW TAP FOR THE PERFORMANCE OF THE METHOD, AND A NUT PRODUCED ACCORDING TO THE METHOD

(75) Inventor: Manfred Vogel, Kappeirodeck (DE)

(73) Assignee: Erich Neumayer GmbH & Co. KG, Hausach (DE)

( * ) Notice: Subject to any disclaimer, the term of this patent is extended or adjusted under 35 U.S.C. 154(b) by 59 days.

(21) Appl. No.: 10/297,943
(22) PCT Filed: Jun. 20, 2001
(86) PCT No.: PCT/DE01/02287
  § 371 (c)(1),
  (2), (4) Date: Dec. 23, 2002
(87) PCT Pub. No.: WO01/98011
  PCT Pub. Date: Dec. 27, 2001

(65) Prior Publication Data
US 2003/0143055 A1 Jul. 31, 2003

(30) Foreign Application Priority Data
Jun. 21, 2000 (DE) .......... 100 30 492

(51) Int. Cl.⁷ .............................. B21D 53/24
(52) U.S. Cl. .............. 470/19; 470/18; 470/88; 470/96; 470/198; 408/224
(58) Field of Search .............. 470/18, 19, 20, 470/21, 25, 88, 96, 198, 199; 408/1 R, 222, 224

(56) References Cited
U.S. PATENT DOCUMENTS 3,378,866 A * 4/1968 Vaernes ............... 408/1 R
4,389,145 A * 6/1983 Capuano .............. 408/1 R
4,396,321 A * 8/1983 Holmes ............... 408/217
5,123,793 A   6/1992 Bonstein ............. 411/310
5,735,658 A   4/1998 Härle ................. 411/414
5,928,084 A * 7/1999 Green ................. 470/198
6,213,885 B1 * 4/2001 Bachle ................ 470/19

FOREIGN PATENT DOCUMENTS

| DE | 848 899 | 9/1952 |
|----|---------|--------|
| DE | 1 090 899 | 10/1960 |
| DE | 195 32 709 | 3/1996 |
| EP | 0 460 335 | 12/1991 |
| GB | 335578 | 9/1930 |
| GB | 1045794 | 10/1966 |

OTHER PUBLICATIONS

"Gewindebohrer," IN: TZ f. prakt. Metallbearb., 64. Jg. 1970, Heft 10, Seite 566.

* cited by examiner

Primary Examiner—Ed Tolan
(74) Attorney, Agent, or Firm—Jacobson Holman PLLC

(57) ABSTRACT

A method of producing a nut having a drive area and a clamping area, and a screw tap for performing the method. A bore hole running through the clamping and drive areas is produced in a cylindrical manner. The screw tap is screwed into the cylindrical bore until a predetermined position is reached. The screw tap is successively provided, when seen in an axial direction from the front side thereof, with a centering/cutting section, an adjoining cutting section which is used to produce a conical internal screw thread section in the clamping area, and a cutting section which is used to produce a cylindrical internal screw thread section in the drive area.

14 Claims, 1 Drawing Sheet

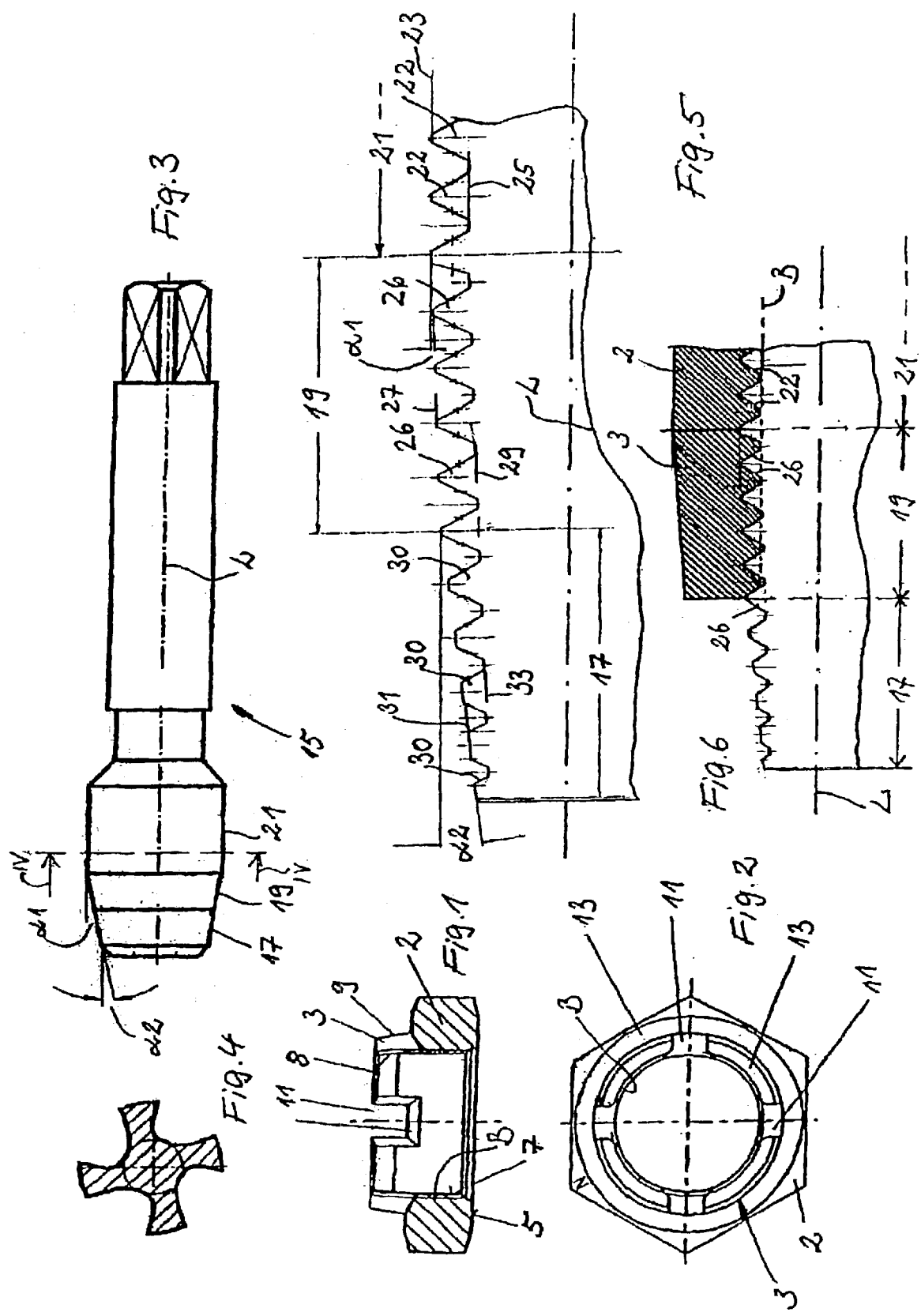

METHOD FOR PRODUCING A NUT, SCREW TAP FOR THE PERFORMANCE OF THE METHOD, AND A NUT PRODUCED ACCORDING TO THE METHOD

This is a nationalization of PCT/DE01/02287, filed Jun. 20, 2001 and published in Germany.

BACKGROUND OF THE INVENTION

1. Field of the Invention

The invention at hand relates to a method and a screw tap for producing a nut having a drive area and a clamping area which are produced as one piece, the nut having a bore that is fully engaged in the clamping and drive areas, with an at least partially cylindrical threaded section in the drive area and an at least partially conical threaded section in the clamping area. The invention also relates to a nut produced according to the method.

2. Description of the Related Art

A nut produced by means of massive reshaping is known from DE 195 32 709, which has a drive area for the contact of a tool, an area for attaching on a component, as well as a clamping area that is slotted in longitudinal direction of the nut so that clamping tongues are arranged between two slots each in the circumference direction. Both the clamping area with the slots and clamping tongues, as well as the drive area are produced by means of massive reshaping, such as cold and/or hot extrusion. The nut's internal thread extends along the drive area at a diameter that is constant, and that is reduced at increasing distances from the drive area at least across part of the axial extension of the clamping area.

The thread of such a nut is usually produced on NC thread cutters, whereby the bore is initially bored cylindrically in the drive area, and conically in the clamping area, and the thread is then cut on the NC cutter. It is clear that such a production method is complicated and expensive. In both processes, the tool movement must occur in conformity of this taper.

SUMMARY OF THE INVENTION

The task of the invention at hand therefore consist of the fact of improving such a method in such a way that it can be performed in a substantially simpler manner, and that nuts can be produced a lot more inexpensively according to this method. Furthermore, a screw tap is to be created for the performance of this method.

The task named above is solved by means of a method for producing a nut that has a drive area and a clamping area which are produced as one piece. The nut has a bore that is fully engaged in the clamping and drive areas with an at least partially cylindrical internal threaded section in the drive area, and an at least partially conical internal threaded section in the clamping area. According to the method and to the screw tap for performing the method, the bore that is fully engaged in the clamping area and in the drive area is produced as a cylindrical bore, with the screw tap being screwed into the cylindrical bore up to a predetermined position. The screw tap has, in the axial direction viewed from its front side, a centering cutting section and a subsequently joining first cutting section that are arranged next to each other for the production of the conical internal threaded section of the clamping area, with a subsequently joining second cutting section for the production of the cylindrical internal threaded section in the drive area. The second cutting section has teeth which extend in a longitudinal direction, the first cutting section has teeth that extend at a first angle laterally to the longitudinal direction, and the centering cutting section has teeth that extend at a second angle laterally to the longitudinal direction and along a line tapering toward said front side, whereby the screw tap is screwed into the bore up to the predetermined position in a first step. The teeth of the second cutting section are mapped in the drive area for the production of the cylindrical internal threaded section, and the teeth of the first cutting section, which extend along an additional line tapering toward said front side, are mapped in the drive area or in the clamping area, respectively, for the production of the conical internal threaded section of the clamping area, whereby the screw tap is turned back from the bore of the nut in a subsequent step.

The nut produced according to the method of the present invention contains a clamping area, a drive area that is connected to the clamping area in one piece, and a support area that is arranged on the side of the drive area that is opposite of the clamping area. A cylindrical internal threaded section extends at least partially across the drive area in a bore that is in the area of the drive area, and a conical internal threaded section is arranged that extends at least partially across the clamping area in the clamping area; these threaded sections are produced in one step by screwing in a screw tap into the cylindrical bore up to a predetermined position, as has just been summarized above. The clamping area is embodied in the shape of a core, and is limited in its external circumference by a conical, or tapered extending lateral area, the tip of which faces the opposite direction of the support area. The clamping area has several axially positioned recesses that are distributed across the circumference, which axially extend at least up to the drive area. The drive area may further include deformations at regular intervals on the radial exterior, on which a tool can be placed for turning out of the nut on a bolt.

The substantial advantage of the invention at hand consists of the fact that the complicated steps for conically boring the clamping area, and for inserting an internal thread by means of an NC machine that are required in relation to prior art can be omitted, because a special screw tap for the production of the internal thread is used, which is already conically formed, and is inserted into a bore that is cylindrical in the area of the clamping area and of the drive area. More specifically, the screw tap used in relation to the method according to the invention is embodied in such a way that in addition to a cylindrical thread cutting section for the production of the cylindrical internal thread, it has a special conical thread cutting section in the drive area for the production of the conical area of the internal thread in the clamping area by means of simple screwing in of the screw tap up to a predetermined axial position. It is of particular importance that the screw tap performs merely a simple, straightforward movement.

According to a further advantageous embodiment of the method, when the screw tap has been screwed into the bore up to the predetermined position, the teeth of the second cutting section are arranged in an entirety of the drive area for the production of the cylindrical internal threaded section, and the teeth of the first cutting section are arranged in an entirety of the clamping area for the production of the conical internal threaded section.

As another embodiment, when the screw tap has been screwed into the bore up to the predetermined position, the teeth of the second cutting section are arranged in the drive area and also are partially engaged in the clamping area for the production of the cylindrical internal threaded section.

As a further embodiment, when the screw tap has been screwed into the bore up to the predetermined position, the teeth of the first cutting section for the production of the conical internal threaded section of the clamping area also at least partially engage into the drive area.

According to further advantageous embodiments of the screw tap, the teeth of the second cutting section may have circular heads and circular legs in the longitudinal direction of the screw tap for the production of the cylindrical internal threaded section of the drive area. The teeth of the first cutting section may also have circular heads that are positioned on a lateral area that is tilted at a first angle to the longitudinal direction of the screw tap, and a tooth height of the teeth of the first cutting section may increase in size toward the front side of the screw tap.

As additional embodiments, the teeth of the first cutting section may have circular legs that are arranged on a lateral area that is tilted at the first angle in relation to the longitudinal direction of the screw tap. The teeth of the centering cutting section may have circular heads that are positioned on a lateral area that is tilted at a second angle to the longitudinal direction of the screw tap, with the second angle preferably being larger than the first angle and with the teeth of the centering cutting section having a tooth height that decreases toward the front side.

Further, the teeth of the centering cutting section may have circular legs that are positioned on a lateral area that is tilted at a third angle in relation to the longitudinal direction of the screw tap, with the third angle corresponding to the first angle.

BRIEF DESCRIPTION OF THE DRAWINGS

The invention and its embodiments are further explained in detail in relation to the figures. They show:

FIG. 1 a longitudinal section across a nut produced in accordance to the inventive method;

FIG. 2 a view onto the nut of FIG. 1 from the side opposite of the base;

FIG. 3 the side view of the inventive screw tap used in relation to the method according to the invention;

FIG. 4 a section across the screw tap of FIG. 3 along the line VI—VI;

FIG. 5 an enlarged illustration of the various, and

FIG. 6 of the screw tap screwed into a nut up to a predetermined position.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The nut illustrated in FIG. 1 essentially consists of a drive area 2 and a clamping area 3, which are both produced as one piece. On the side facing the base, i.e., on the side opposite of the clamping area 3, the nut has a support area 5. The cylindrical threaded section of the drive area 2 of the nut is identified by 7.

The drive area 2 has deformations 9 at regular intervals on its radial exterior, which, for instance, form a multitude of edges, and are provided for the contact of the tool, with the aid of which the nut can be pivoted on a bolt, or similar.

The clamping area 3 that axially joins the drive area 2 is embodied as a core, and is limited in its outer circumference by a conically, or taper shaped lateral area 9, the cone tip of which faces in the opposite direction of the support area 5. The clamping area 3 has several slots, or axially directed recesses 11 that are distributed across the circumference, which axially extend up to the drive area 2. The clamping tongues formed between two slots each are identified by 13. The conical threaded section of the clamping area 3 is identified by 8.

It has already been pointed out that normally the threaded sections 7 and 8 are produced by initially inserting a cylindrical bore into the drive area 2, and a conical bore into the clamping area 3, and that the cylindrical threaded section 7, and the conical threaded section 8 are subsequently produced with the aid of an NC thread cutter.

According to the method at hand, the threaded sections 7 and 8 are produced by means of manufacturing only one single axially extending cylindrical bore B in that a screw tap 15 embodied according to FIG. 3 is screwed into the cylindrical bore B from the side of the support area 5 up to a predetermined position in a manner to be further explained as follows. The bore can preferably be produced by reshaping.

The screw tap 15 has three different threaded cutting sections that are arranged next to each other, viewed in axial direction from the front. The front most centering cutting section 17 is first inserted into the cylindrical bore of the nut and serves for the purpose of centering the screw tap 15 in relation to the cylindrical bore B of the nut, and to pre-cut the thread in the section 21. The cutting section 19 joins the centering cutting section 17, which serves for the production of the conical internal thread of the clamping area 3. In addition to the cutting section 19, a third cutting section 21 is positioned on the side opposite of the centering cutting section 17, which serves the purpose of producing the cylindrical internal threaded section 7 in the drive area 2 of the nut.

The previously mentioned cutting sections 17, 19, and 21 are illustrated grossly enlarged in FIG. 5. Accordingly, the cutting section 21 provided for the production of the cylindrical internal threaded section 7 in the drive area 2 has teeth, the circular heads 23 and circular legs 25 of which extend in longitudinal direction L.

The teeth of the cutting section 19 are identified by 26. They are embodied in such a way that their circular heads 27 each are positioned on an intended lateral area, which is tilted at an angle $\alpha 1$ to the longitudinal direction L so that the teeth 26 each have a smaller tooth height toward the front side of the screw tap 15. Preferably, the circular legs 29 of the teeth 26 of the cutting section 19 are also arranged at an angle $\alpha 1$ in relation to the lateral area that is tilted toward the axial direction L.

Finally, the teeth 30 of the centering cutting section 17 are created in such a way that their circular heads 31 are positioned on an intended lateral area that is tilted toward the longitudinal axis of the screw tap 15 at an angle $\alpha 2$, whereby the angle $\alpha 2$ preferably is larger than the angle $\alpha 1$. Preferably, the teeth 30 have a teeth height that decreases toward the direction of the front side. Preferably, the respective circular legs 33 of the teeth 30 are also arranged on an intended lateral area at an angle in relation to the longitudinal axis L, which, for instance, corresponds to angle $\alpha 1$.

According to the inventive method, the screw tap 15 is screwed into continuous, i.e., both in the clamping area 3, and in the drive area 2 cylindrically extending bore of a nut that is centered and clamped in the thread cutter up to an axial position until the cutting section 19 is located at the desired position of the clamping area 3, and the cutting section 21 is at the desired position at the drive area 2. The cutting section 17 protrudes at least partially across the clamping area 3 of the nut. After the mentioned predetermined position has been achieved, the desired conical thread is therefore created in the clamping area 3, and the teeth 22 of the cutting section 21 are mapped exactly in the drive area 2. This condition is illustrated in FIG. 6. Finally, the screw tap 15 is turned back from the predetermined position, and is removed from the nut. The teeth 30 and/or 26 of the cutting sections 17 and 19 serve for precutting of the teeth of the internal thread 7 of the drive area during the screwing in of the screw tap 15 up to the predetermined position. Accordingly, the teeth 30 of the section 17 serve for precutting of the teeth of the internal thread 8 of the clamping area.

It must be pointed out that the cutting sections 19 and 21 can be dimensioned in such a way that part of the teeth 22 of the cutting section 21 can also be penetrated into the clamping area 3 in the predetermined position so that the created cylindrical threaded section 7 extends beyond the drive area 2, partially into the clamping area 3. In reverse order it is also possible to dimension the cutting sections 19 and 21 in such a way that part of the teeth 26 of the cutting section 19 also penetrate the drive area 2 in the predetermined position.

It must be further pointed out that the term "conical" means all shapes that taper toward the front side of the screw tap 15.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method for producing a nut that has a drive area and a clamping area which are produced as one piece, the nut having a bore that is fully engaged in the clamping area and the drive area with an at least partially cylindrical internal threaded section in the drive area, and an at least partially conical internal threaded section in the clamping area, comprising the steps of:

producing the bore that is fully engaged in the clamping area and in the drive area as a cylindrical bore;

screwing a screw tap into said cylindrical bore up to a predetermined position, said screw tap having in axial direction, viewed from a front side thereof, a centering cutting section and a subsequently joining first cutting section that are arranged next to each other for the production of the conical internal threaded section of the clamping area, and a subsequently joining second cutting section for the production of the cylindrical internal threaded section in the drive area, said second cutting section having teeth which extend in a longitudinal direction, said first cutting section having teeth that extend at a first angle laterally to the longitudinal direction, and the centering cutting section having teeth that extend at a second angle laterally to said longitudinal direction;

mapping said teeth of the second cutting section in the drive area of the nut for the production of the cylindrical internal threaded section, and mapping the teeth of the first cutting section in the drive area, or in the clamping area, respectively, of the nut for the production of the conical internal threaded section of the clamping area; and subsequently turning back the screw tap from the bore of the nut.

2. The method according to claim 1, wherein in said predetermined position, the teeth of the second cutting section are arranged in an entirety of the drive area for the production of the cylindrical internal threaded section, and the teeth of the first cutting section are arranged in an entirety of the clamping area for the production of the conical internal threaded section.

3. The method according to claim 1, wherein in the predetermined position, the teeth of the second cutting section are arranged in the drive area and also are partially engaged in the clamping area for the production of the cylindrical internal threaded section.

4. The method according to claim 1, wherein in the predetermined position, the teeth of the first cutting section for the production of the conical internal threaded section of the clamping area also at least partially engage into the drive area.

5. A screw tap for producing a nut that has a drive area and a clamping area which are produced as one piece, the nut having a bore that is fully engaged in the clamping area and the drive area with an at least partially internal cylindrical threaded section in the drive area, and an at least partially conical internal threaded section in the clamping area, said screw tap producing said bore as a cylindrical bore and being screwed therein up to a predetermined position, said screw tap comprising:

a centering cutting section at a front side of said screw tap and a subsequently joining first cutting section adjacent thereto in an axial direction for the production of the conical internal threaded section of the clamping area;

a subsequently joining second cutting section adjacent said first cutting section in the axial direction for the production of the cylindrical internal threaded section in the drive area;

said second cutting section having teeth that extend in a longitudinal direction, said first cutting section having teeth that extend along a line tapering toward said front side, and said centering cutting section having teeth that extend along an additional line that tapers toward said front side.

6. The screw tap according to claim 5, wherein the teeth of the second cutting section have circular heads and circular legs in the longitudinal direction of the screw tap for the production of the cylindrical internal threaded section of the drive area.

7. The screw tap according to claim 5, wherein the teeth of the first cutting section have circular heads that are positioned on a lateral area that is tilted at a first angle to the longitudinal direction of the screw tap.

8. The screw tap according to claim 7, wherein a tooth height of the teeth of the first cutting section increases in size toward the front side of the screw tap.

9. The screw tap according to claim 7, wherein the teeth of the first cutting section have circular legs that are arranged on a lateral area that is tilted at said first angle in relation to the longitudinal direction of the screw tap.

10. The screw tap according to claim 7, wherein the teeth of the centering cutting section have circular heads that are positioned on a lateral area that is tilted at a second angle to the longitudinal direction of the screw tap.

11. The screw tap according to claim 10, wherein the second angle is larger than the first angle.

12. The screw tap according to claim 10, wherein the teeth of the centering cutting section have a tooth height that decreases toward the front side.

13. The screw tap according to claim 10, wherein the teeth of the centering cutting section have circular legs that are positioned on a lateral area that is tilted at a third angle in relation to the longitudinal direction of the screw tap.

14. The screw tap according to claim 13, wherein the third angle corresponds to the first angle.

* * * * *